United States Patent Office 3,337,657
Patented Aug. 22, 1967

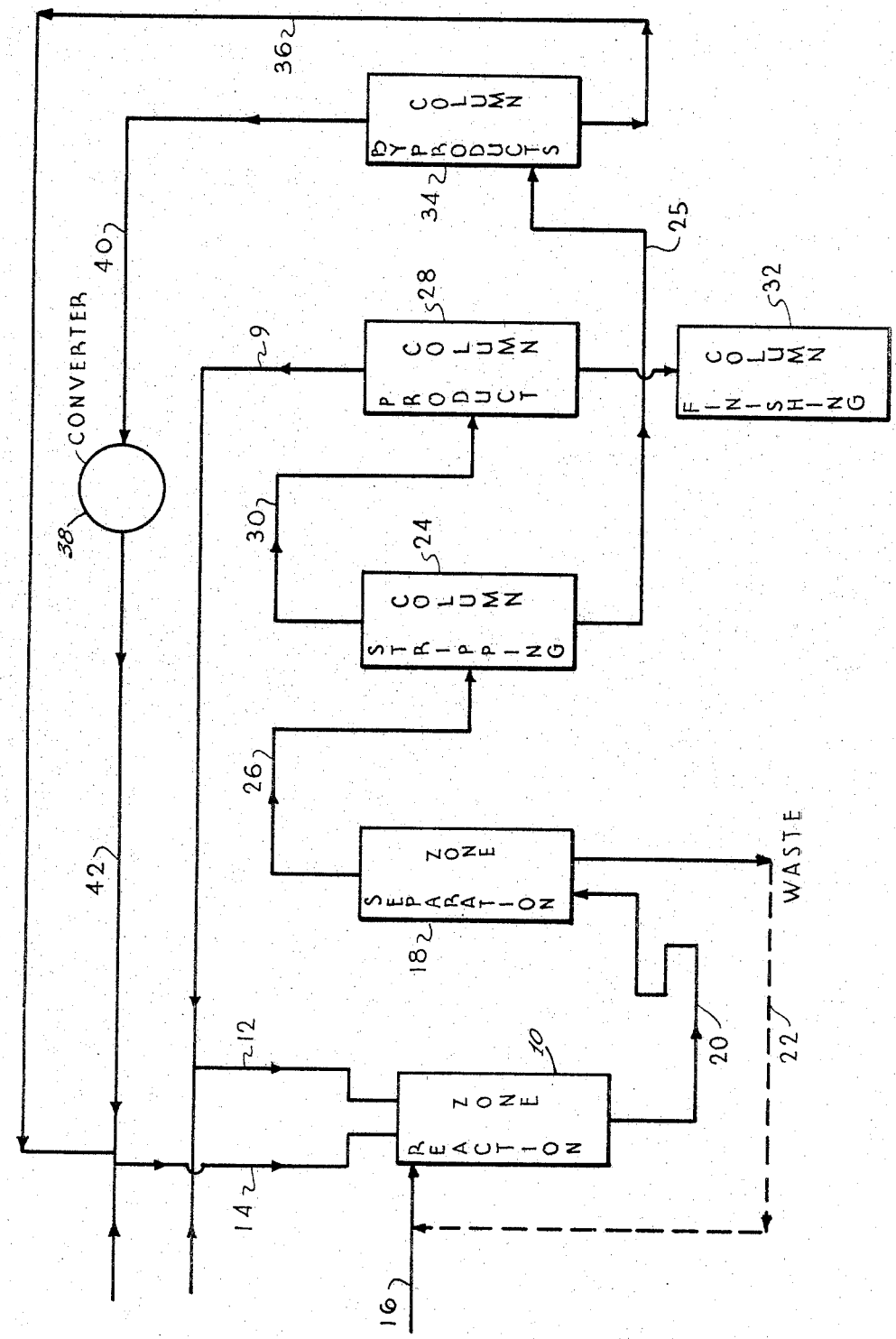

3,337,657
PREPARATION OF TRIALKYL PHOSPHITES
Arthur C. Schulz, North Tonawanda, N.Y., assignor to Hooker Chemical Corporation, Niagara Falls, N.Y., a corporation of New York
Filed May 31, 1963, Ser. No. 284,493
The portion of the term of the patent subsequent to Aug. 17, 1982, has been disclaimed
7 Claims. (Cl. 260—982)

This invention relates to the preparation of esters of phosphorous acid. More particularly, it relates to the preparation of trialkyl phosphites, such as trimethyl phosphite, triethyl phosphite and triisopropyl phosphite.

This is a continuation-in-part of U.S. patent application S.N. 174,334, filed Jan. 9, 1962, now Patent No. 3,201,435.

It is known to prepare lower alkyl triesters of phosphorous acid by transesterification. For example, triethyl phosphite may be prepared by reacting ethanol with a triorgano-phosphite containing at least one aromatic radical and recovering the desired lower trialkyl phosphite by distillation. Although the yields obtainable have been for the most part satisfactory, practice of the instant invention makes high yields of the lower trialkyl esters of phosphorous acid more readily obtainable.

It has been discovered that by the improved process for preparing lower trialkyl phosphites of this invention the quantity of by-products which may normally be formed is minimized to give increased yields of the lower trialkyl phosphite. In accordance with this invention it has been discovered that lower trialkyl phosphites may be prepared by passing into a reaction zone a mixture of a phosphorus-containing compound of the general formula:

$$P(OR)_3$$

where R is alkyl, aryl or mixture thereof, with at least one phosphorus valence being satisfied by an oxyaryl radical, a lower alkyl alcohol and a transesterification catalyst, removing said catalyst from said mixture and recovering a lower trialkyl phosphite from the resultant reaction mixture. In the practice of this invention it has been found that the production of by-products is minimized by removal of the catalyst prior to the recovery of the desired lower trialkyl phosphite, apparently because the rate of back-transesterification is thereby minimized. It has also been found that some by-products formed during the reaction may be recycled and utilized in the preparation of additional desired lower trialkyl phosphite once the catalyst and desired product have been removed from the process stream.

The accompanying drawing illustrates the preferred process of the invention. It is to be understood that this process may be suitably conducted utilizing alkyl alcohols containing between about 1 to 6 carbon atoms, but is preferably conducted with alkyl alcohols containing 1, 2 and 3 carbon atoms.

Referring to the drawing, which is a block diagram of the preferred process of the invention, 10 is a reaction zone through which is passed a lower alkyl alcohol, a phosphorus containing compound and a transesterification catalyst from sources, not shown, by conduits 12, 14 and 16, respectively. To the reaction zone is added a catalytic amount of a transesterification catalyst through conduit 16, concomitantly with the other reactants. The stream of the reaction mixture is then conveyed to a separation zone 18 through conduit 20. Under the conditions prevailing in the separation zone 18 the reaction products are removed from the catalyst and non-volatile by-products. The catalyst and the non-volatile by-products may then be recycled, if desired, to reaction zone 10 via recycle conduit 22 and conduit 16, but are generally removed from the system as waste. The reaction products free of catalyst may then be transferred to stripping column 24 by conduit 26. In the stripping column 24 the lower boiling trialkyl phosphite and lower alkyl alcohol may be separated from the higher boiling by-products. For purposes of this invention, lower boiling products are considered to be the desired trialkyl phosphite and products having boiling points, under the prevailing conditions, lower than the trialkyl phosphite. Higher boiling by-products are those products which have a higher boiling point than the desired trialkyl phosphite. The lower boilers are then separated in product column 28 to recover the desired lower trialkyl phosphite after being conveyed there by conveyor means 30. This is true when aliphatic alcohols containing between 1 and 3 carbon atoms are utilized, however, other means of separating aliphatic alcohols containing between 4 and 6 carbon atoms from the trialkyl phosphite may be utilized in the practice of this invention. The recovered phosphite product if so desired, may then be further purified in finishing column 32. The recovered alcohol is recycled to reaction zone 10 via conduits 29 and 12. By-products column 34 receives the by-products of the reaction and separates the aromatic by-products containing hydroxyl groups from other by-products. The by-products, other than the aromatic by-products containing hydroxyl groups, are recycled to the reaction zone 10 via conduit 36, while the aromatic by-product containing hydroxyl groups is conveyed to converter 38 via conduit 40 where a triaromatic phosphite may be formed which may then be conveyed to reaction zone 10 via conduits 42 and 14.

When conducting the process of this invention with methanol, ethanol or isopropyl alcohol and triphenyl phosphite the catalyst and non-volatile by-products are removed by means of flash vaporization. The separation or catalyst remover column 18 is placed under sub-atmospheric conditions and a temperature so that the reaction mixture entering the separation column 18 via conduit 20 is passed from substantially atmospheric pressure to an area of reduced pressure which causes total vaporization of the products and volatile by-products formed in the reaction zone 10, but does not vaporize the catalyst or non-volatile by-products. The catalyst which is in the reaction mixture and the non-volatile material will remain in the separation zone 18 to be removed or recycled if desired, as indicated above. In the stripping column 24 the trialkyl phosphite and the respective alcohol are removed to the product column 28 by maintaining conditions in stripping column 24 which will vaporize the trialkyl phosphite but does not vaporize the by-products which have higher boiling points. The by-products which comprise essentially phenol, dialkyl phenyl phosphite, diphenyl alkyl phosphite and boil higher than the trialkyl phosphite are conveyed via conduit 25 to by-product column 34, where phenol is recovered and recycled as indicated above and the by-products are recycled to the reaction zone.

The reaction zone 10 of the invention may be maintained at a temperature below or about the boiling point of the trialkyl phosphite under the prevailing conditions. It has been found that the reaction zone 10 may be maintained at about the refluxing temperature of the reaction mixture, but a temperature of between 15 and 150 degrees centigrade may also be employed. However, satisfactory results may be obtained utilizing a temperature of between about 25 and 135 degrees centigrade. It is preferred that the temperature in the reaction zone be maintained at between about 85 and 95 degrees centigrade when utilizing ethanol and isopropyl alcohol and about between 55 and 75 degrees centigrade when utilizing methanol. The reactants are fed into reaction zone 10 at a rate to maintain an excess of alcohol. The ratio of alcohol to the phosphorus containing composition may be about from 3:1 to 15:1. It being desired to maintain the equilibrium of the reaction

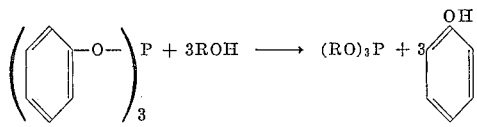

as far to the right as possible. Thus, ratios of between about 3:1 and 9:1 are preferred. In the reaction zone the reaction of the triphenyl phosphite and ethanol is only partially completed. The reaction reaches equilibrium as it passes through conduit 20 which is maintained within the temperature ranges set for the reaction zone 10.

The products and by-products of the reaction are then passed into the separation zone or column 18 which in the preferred embodiment of this invention comprises a zone maintained under reduced pressure to volatilize or "flash vaporize" all reactants and by-products, but essentially avoiding the vaporization of the catalyst and non-volatile by-products as set forth above. The vapor flow is then carried over to the stripping column 24 leaving substantially all the catalyst and non-volatile by-products in the separating column. The separation column 18 of the invention is maintained at a temperature and pressure which will minimize the buildup of catalytic residue. Generally a temperature of between about 20 and 125 degrees centigrade, at a pressure of from 1 to 750 mm. of mercury may be utilized in the separation zone 18. It being preferred, however, to utilize a temperature of between about 20 to 110 degrees centigrade at between 25 to 50 mm. of mercury. The temperature and pressure in the stripping column 24 may be maintained within a range to effectuate the separation of lower trialkyl phosphite and lower boiling substances from the higher boilers. Temperatures in the range from between about 20 and 140 degrees centigrade have been found satisfactory when utilizing atmospheric or sub-atmospheric pressures. The product column 28 is maintained at a temperature, under prevailing conditions which will effectuate the separation of the lower trialkyl phosphite from other lower boilers. Generally a temperature between about 55 and 140 degrees centigrade may be utilized when atmospheric or sub-atmospheric pressures are imposed on the column. The by-product column 34 may be operated at a temperature and pressure which separates the aromatic by-product from other by-products. In the preferred process of this invention the phenol column 34 is maintained at a temperature between about 60 and 135 degrees centigrade at sub-atmospheric pressure.

Although the above description illustrates the utilization of flash vaporization to remove the catalyst from the reaction mixture to minimize back transesterification and decrease the rate of reaction, other means may possibly be utilized to decrease the rate of reaction, e.g., neutralization of the catalyst, filtering of the catalyst, by ion exchange membrane and so forth.

Illustrative of the phophorus containing compounds which may be utilized in the practice of this invention are aryl dialkyl phosphites, such as phenyl dimethyl phosphite, o,m,p-cresol diethyl phosphite, 2,3,6-trimethylphenyl diisopropyl phosphite, 6-ethyl-2-methylphenyl dibutyl phosphite, phenyl dihexyl phosphite, etc., diaryl alkyl phosphites, such as, dephenyl ethyl phosphite, di(3,4-dimethylphenyl)butyl phosphite, di-(trimethylphenyl)pentyl phosphite, di-(3-ethyl-4-methylphenyl)hexyl phosphite, etc., triaryl phosphites, such as triphenyl phosphite, tricresyl phosphite, tri(5-ethyl-2-methylphenyl)phosphite, etc., and mixtures of the aryl dialkyl phosphites, diaryl alkyl phosphites and trialkyl phosphites.

Transesterification catalysts known to the art may be utilized in the practice of this invention. In the preferred embodiment of the invention a small but effective amount is utilized, usually between about 0.01 and 0.5 percent by weight of the phosphorus-containing compound is deemed sufficient. Among these catalysts are included metal alcoholates and phenolates. It is preferred, however, to utilize the alkaline metal salts of an alcohol or phenol. Typical examples are sodium methylate, lithium methylate, lithium ethylate, potassium methylate, sodium ethylate, sodium isopropylate, sodium dodecylate, sodium cetylate, sodium octadecylate, sodium phenolate, potassium phenolate, sodium cresylate, calcium ethylate (a metal alcoholate). Strong organic bases may also be utilized, such as, quaternary ammonium hydroxides, e.g., trimethyl benzyl ammonium hydroxide, substituted guanidines, e.g., pentamethyl guanidines. Strong inorganic bases may also be suitable such as sodium hydroxide and potassium hydroxide.

The alcohols which may be suitable in the practice of this invention are methyl, ethyl, propyl, isopropyl, butyl, isobutyl, heptyl and hexyl alcohols. It is to be understood that the separation of the trialkyl phosphite may differ in accordance with the alcohol being formed. However, higher yields of the desired phosphite may be experienced utilizing the process of this invention. In the preferred embodiment trimethyl, triethyl, or triisopropyl phosphite is separated from its corresponding alcohol in the product column 28 which may be maintained at a temperature of between about 50 to 125 degrees centigrade under sub-atmospheric pressures.

The following examples illustrate the invention, but are not to be interpreted as limiting it in any respect. All parts are by weight and temperatures in degrees centigrade unless otherwise stated.

*Example 1*

6,801 parts of ethanol were passed into a reaction zone together with 262 parts of a sodium catalyst. 3.7 percent of this catalyst was sodium, the remainder was alcohol, i.e. ethyl alcohol. Triphenyl phosphite (4,200 parts) was passed into the reaction zone together with the catalyst and ethanol. The reaction zone was maintained at atmospheric pressure and a temperature of about 90 degrees centigrade. The reaction product was conveyed to a separating zone which was maintained at a temperature of between about 103 and 108 degrees centigrade at 45 mm. absolute pressure. A catalyst residue of 264 parts was recovered from this separating column. The vapor stream was carried over to a stripping column which was maintained at between about 27 and 105 degrees centigrade at 45 mm. absolute pressure. 2,135 parts of triethyl phosphite were recovered from this column. The phenol which was separated in the stripping column was then passed through a phenol column where 3,649 parts were recovered. The phenol column being maintained at a temperature of between 75 and 125 degrees centigrade at from 11 to 16 mm. absolute pressure. The above results show that about 91 percent triethyl phosphite is recoverable by known techniques. The weight ratio of ethanol to triethyl phosphite in the distillate varied from about 2:1 to about 4:1.

*Example 2*

This example illustrates the batch technique for preparing triethyl phosphite. Triphenyl phosphite (154 grams), ethanol (138 grams), and sodium (0.5 gram) were added to a reaction vessel, and the vessel and its contents were heated to a temperature of about 100 degrees centigrade, while the reactants were being agitated. While the reactants were maintained at a temperature of about 100 degrees centigrade, a total of 4,190 milliliters of ethanol were added to the reaction flask during a period of about ten hours and forty-five minutes and as the reaction progressed, a gaseous mixture of ethanol and triethyl phosphite passed through a water cooled condenser, and collected in a product vessel. Distillate was collected at one-half hour intervals and analyzed for phosphorus by the flame spectrophotometer and for phosphite by titration with a standard iodine solution. About 78 percent of the phosphorus initially charged to the reaction vessel as triphenyl was recovered in the product flask as triethyl phosphite; the weight ratio of ethanol to triethyl phosphite in the distillate varied from about 26:1 to about 106:1.

Example 1 as compared with Example 2 shows the greater conversion to the desired phosphite which results from the practice of this invention. It is, therefore, obvious that other means for removing the reactants from the catalyst such as by neutralization of the catalyst or by an ion exchange membrane and so forth, also will give improved results.

*Example 3*

The process of Example 1 was repeated except that in addition to triephenyl phosphite, recycle by-products of diethylphenyl phosphite, ethyldiphenyl phosphite, and triphenyl phosphite which were recovered from the stripping column were recycled to the reaction zone and ethanol which was recovered from the product column also was recycled to the reaction zone. The yield obtained by this process increased the overall yield of triethyl phosphite recoverable to about 95 percent.

*Example 4*

Triisopropyl phosphite was prepared in a manner similar to that used to prepare triethyl phosphite as described in Example 1. Isopropanol, triphenyl phosphite and sodium (in the ratio of 15 moles to 2 moles to 0.087 mole) were passed to a vaporizer maintained at about 126 degrees centigrade and about 45 mm. of mercury pressure. During this time the effluent from the vaporizer was subjected to continuous distillation at a pressure of 45–59 mm. of mercury, and 521 parts of distillate were collected at a vapor temperature of between 41–43 degrees centigrade. The distillate was analyzed by gas chromotography and found to contain a component other than isopropanol in an amount representing about 5 percent. Phosphorus assays (iodimetric and flame spectrophotometric) showed the presence of a trivalent phosphorus compound in an amount equal to about 5 percent (calculated as

$(C_3H_2O)_3P$)

Distillation of this material led to the recovery of a fraction with a melting point of 65.5–67 degrees centigrade at 10 mm. pressure which was identified by infrared analysis as containing 85 percent triisopropyl phosphite.

*Example 5*

Triphenyl phosphite (3,559 parts), and a recycle by-products stream from a previous run comprising at least dimethylphenyl phosphite, diphenylmethyl phosphite, and triphenyl phosphite (203 parts) were added to a feed tank. Methanol (1,220 parts), sodium methylate (13.3 parts by weight) and recycled methanol (2,832 parts) were added to a second feed tank. About 157 parts by weight per hour and 170 parts by weight per hour from the first and second tanks, respectively, were fed into a reaction zone maintained at about between 60 and 65 degrees centigrade. After leaving the reaction zone, the mixture was continuously "flashed" into the vaporizer which was maintained at a pressure of about forty-five millimeters of mercury absolute at a temperature of between about 95 and 100 degrees centigrade. In the vaporizer which is maintained at a pressure of about forty-five millimeters of mercury absolute and wherein a substantially total flash vaporization of trimethyl phosphite, methanol, phenol and trivalent phosphorus-containing compounds other than trimethyl phosphite occurs in an overhead vapor stream. A very small quantity of vaporization residue which is a highly concentrated mixture of essentially non-volatile, non-reusable by-products is withdrawn from the vaporizer as a bottom stream and is discarded.

Distillate from the methanol stripping column was continuously fed to the product column. This distillate had an average composition of about thirty-seven weight percent of trimethyl phosphite in methanol and contained small amounts of anisole and miscellaneous impurities.

The product column was operated at atmospheric pressure. Under this pressure, the temperature in the top of the product column was about sixty-six degrees centigrade, and the bottom temperature was about one hundred and ten to one hundred and twelve degrees centigrade. Distillate from the product column was recovered at the rate of about one hundred and twenty-six parts by weight per hour, and was used together with fresh methanol to make the methanolic feed material in the said second feed tank. The methanolic distillate from the product column had a trimethyl phosphite content of about six weight percent. The bottom stream from the product column was withdrawn at a rate of about fifty-four parts by weight per hour. The withdrawal rate was based upon maintaining a constant level in the "pot" of the product column. This bottom stream material averaged about ninety-eight weight percent of trimethyl phosphite, with the remainder being mostly anisole and pentavalent phosphorus-containing impurities. Trimethyl phosphite of greater than about ninety-nine weight percent purity was continuously recovered by distilling this product column bottom stream at about two hundred and fifty millimeters of mercury absolute pressure while using continuous distillation techniques.

The bottom stream from the methanol stirpping column was continuously fed to the phenol column. The phenol column was operated under an absolute pressure of about five millimeters of mercury. A "pot" temperature of about one hundred and fourteen degrees centigrade was maintained in the phenol column, and the temperature in the top portion of the column was about sixty to seventy degrees centigrade. Phenol of about ninety-eight percent purity was obtained as a distillate from the column at a rate of about one hundred and twenty-one parts by weight per hour. Anisole was the main impurity in this recovered phenol. The bottom stream from the phenol column was withdrawn to maintain a constant "pot" level. The rate of bottom stream withdrawal was about 9.6 parts by weight per hour. The bottom stream was employed, together with fresh triphenyl phosphite, to prepare the phosphorus-containing feed materials in the said first feed tank. The phenol column bottom stream consisted essentially of trivalent phosphorus-containing compounds and phenol. The trivalent phosphorus content of this stream was the calculated molar equivalent to about sixty weight percent diphenyl methyl phosphite.

For the twenty-four hour operating period described above the overall yield of trimethyl phosphite from triphenyl phosphite was about ninety percent, and about eighty-eight percent of the theoretically possible amount of phenol was recovered. During the operation of the process as described above, there were no signs of any problems which would have prohibited further continuous operation.

While the invention has been set forth in relation to particulars and specifics of the examples and drawing above, it should be realized that the invention in its broadest aspects is not limited to the specifics of the above mentioned examples and drawing. Many other modifications will become apparent to one skilled in the art upon a reading of this basic disclosure; these modifications are considered within the scope of this invention.

What is claimed is:

1. A process for preparing a trialkyl phosphite which comprises reacting a compound of the formula

wherein R is aryl and R' and R" are independently selected from the group consisting of alkyl and aryl, an alkanol of 2 to 7 carbon atoms and an alkaline transesterification catalyst, separating the catalyst and non-volatile byproducts of the reaction from the rest of the reaction mixture, comprising trialkyl phosphite, alkanol, hydroxy-aromatic byproduct and tertiary phosphites other than trialkyl phosphite, by total vaporization of said rest of the reaction mixture, leaving the catalyst and non-volatile byproducts of the reaction as a residue and separating the lower trialkyl phosphite from the other components of the resultant mixture of vaporized materials.

2. A process according to claim 1 wherein the components of the resultant mixture of vaporized materials, other than the trialkyl phosphite separated therefrom are returned to a reaction mixture in which

and alkanol are being reacted in the presence of an alkaline transesterification catalyst to form a trialkyl phosphite.

3. A process according to claim 1 wherein an excess of alkanol is employed and the reaction temperature is from 15 to 150 degrees centigrade.

4. A process according to claim 1 in which the reaction is effected at a temperature below the boiling point of the trialkyl phosphite.

5. A process according to claim 4 wherein the catalyst and non-volatile byproducts of the reaction are separated from the rest of the reaction mixture by total vaporization of said rest of the reaction mixture, at a temperature of between about 20 and 110 degrees centigrade and a pressure of between 25 and 50 millimeters of mercury absolute pressure leaving the catalyst and non-volatile byproducts of the reaction as a residue.

6. A process according to claim 5 wherein the alkanol is employed in excess, the transesterification reaction is conducted at a temperature within the range of 15 to 150 degrees centigrade and the total vaporization by which the catalyst is separated from the volatile materials is effected at a temperature within the range of 20 to 110 degrees centigrade at a pressure of from 25 to 50 millimeters of mercury.

7. A process according to claim 6 wherein the alkanol is ethanol, the phosphite reactant is triphenyl phosphite, the catalyst is an alkaline metal alcoholate, the transesterification reaction is effected at 90 to 100 degrees centigrade, the total vaporization is effected at 103 to 108 degrees centigrade, triethyl phosphite is separated from the other components of the volatile materials evaporated by distillation therefrom at a temperature from 27 to 105 degrees centigrade at reduced pressure, and the other volatile materials are returned to the reaction mixture and the process is conducted continuously.

References Cited
UNITED STATES PATENTS

| | | | |
|---|---|---|---|
| 2,970,166 | 1/1961 | Rosin et al. | 260—461.315 |
| 3,047,608 | 7/1962 | Friedman et al. | 260—461.315 |
| 3,056,823 | 10/1962 | Hechenbleikner | 260—461.315 |
| 3,056,824 | 10/1962 | Hecker et al. | 260—461.315 |
| 3,201,435 | 8/1965 | Schulz. | |

CHARLES B. PARKER, *Primary Examiner.*

J. P. BRUST, R. L. RAYMOND, F. M. SIKORA,
*Examiners.*

UNITED STATES PATENT OFFICE
CERTIFICATE OF CORRECTION

Patent No. 3,337,657                                August 22, 1967

Arthur C. Schulz

It is certified that error appears in the above identified patent and that said Letters Patent are hereby corrected as shown below:

Column 1, line 13, cancel "trimethyl phosphite,"; line 16, "Jan. 9, 1962" should read -- Jan. 29, 1962 --. Column 4, line 16, cancel "methyl,". Column 5, line 45, beginning with "Example 5" cancel all to and including "operation." in line 54, column 6.

Signed and sealed this 13th day of January 1970.

(SEAL)
Attest:

Edward M. Fletcher, Jr.                          WILLIAM E. SCHUYLER, JR.
Attesting Officer                                    Commissioner of Patents